United States Patent
Lee et al.

(10) Patent No.: US 7,843,936 B2
(45) Date of Patent: Nov. 30, 2010

(54) DISTRIBUTED CONTROLLED PASSIVE OPTICAL NETWORK SYSTEM AND BANDWIDTH CONTROL METHOD THEREOF

(75) Inventors: Shi-Wei Lee, Taoyuan (TW); Yu-Min Lin, Hsinchu (TW); Chih Hung Hsu, Taichung (TW); Maria C. Yuang, Hsinchu (TW); Ju-Lin Shih, Taipei (TW); Shih-Hsuan Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 113 days.

(21) Appl. No.: 12/331,447

(22) Filed: Dec. 10, 2008

(65) Prior Publication Data

US 2010/0067376 A1     Mar. 18, 2010

(30) Foreign Application Priority Data

Sep. 16, 2008    (TW) ................................ 97135444 A

(51) Int. Cl.
    *H04J 3/26*        (2006.01)
(52) U.S. Cl. .................... 370/395.2; 370/432; 370/437; 370/468; 398/69; 398/75
(58) Field of Classification Search ................. 370/468; 398/98
See application file for complete search history.

(56) References Cited

U.S. PATENT DOCUMENTS

| | | | |
|---|---|---|---|
| 2003/0210664 A1* | 11/2003 | Achour et al. | 370/329 |
| 2003/0225739 A1* | 12/2003 | Chesson et al. | 707/1 |
| 2004/0190548 A1* | 9/2004 | Harel et al. | 370/466 |
| 2006/0083245 A1* | 4/2006 | Tanaka et al. | 370/395.2 |
| 2006/0233197 A1* | 10/2006 | Elmoalem et al. | 370/468 |
| 2007/0237177 A1* | 10/2007 | Endo et al. | 370/468 |
| 2008/0069139 A1* | 3/2008 | Asashiba et al. | 370/468 |

* cited by examiner

*Primary Examiner*—Seema S Rao
*Assistant Examiner*—Wanda Z Russell

(57) ABSTRACT

Disclosed is a distributed controlled passive optical network system and bandwidth control method thereof. The system comprises an optical line terminal (OLT), plural optical network units (ONUs) and a splitter with combiner. Each ONU has a first Tx/Rx for respectively transmitting and receiving data packets on an upstream data channel and a downstream data channel, and a second Tx/Rx for transmitting and receiving control signals/commands on a control channel. Upstream data of each ONU is carried by the upstream data channel and sent to the OLT through the splitter with combiner. Downstream data of the OLT is carried by the downstream data channel and sent to corresponding ONUs through the splitter with combiner. With the control signals/commands carried by the control channel, the required information of network status among the ONUs is provided.

17 Claims, 16 Drawing Sheets

DISTRIBUTED CONTROLLED PASSIVE OPTICAL NETWORK SYSTEM AND BANDWIDTH CONTROL METHOD THEREOF

FIELD OF THE INVENTION

The present invention generally relates to a distributed controlled passive optical network system and bandwidth control method thereof.

BACKGROUND OF THE INVENTION

The current network access technologies are mainly based on asymmetric digital subscriber line (ADSL) and cable modem. More and more fiber to the home (FTTH) access networks are also under construction in recent years. Passive optical network (PON) is a broadband access network that is rapidly gaining popularity recently. The network architecture of PON is usually a tree-based topology, with a terminal device at one end of the tree, called optical line terminal (OLT), and the other end of the tree including a plurality of branches with a user device at the end of each branch, called optical network unit (ONU). OLT and ONU of PON are connected through passive elements. The downlink packet transmission of PON is in broadcast mode, i.e., the packet from OLT may be received by all ONUs.

The uplink packet transmission is in time division multiple access (TDMA) manner. PON must have appropriate control mechanism to avoid the collision caused by the packets sent by two or more ONUs at the same time. To improve the network utilization, a dynamic bandwidth allocation (DBA) method is used to allocate bandwidth to each ONU.

The bandwidth allocation of TDMA PON is basically the OLT polling the ONUs or the ONUs using piggyback to add the backlog data to be transmitted to the end of the upstream packets to the OLT. However, as the distance between OLT and ONU may be as long as 30 km, the single-round polling may take several hundreds of micro-seconds ($\mu$ sec) in signaling. With piggyback and multiple users online simultaneously, two successive piggyback turns for the same ONU may also be as high as few milli-seconds (msec).

Distributed controlled PON usually uses carrier sense multiple access/collision detection (CSMA/CD) technology. FIG. 1 shows a schematic view of an exemplary distributed controlled PON system. In the exemplary distributed controlled PON system in FIG. 1, downstream data is carried by wavelength $\lambda_2$, and the signal is split at star coupler (SC) 101 to be broadcast to all ONUs. Upstream data is carried by wavelength $\lambda_1$, and the signal is broadcast at star coupler (SC) 101 to OLT and all ONUs. Therefore, all ONUs may listen to $\lambda_1$ to know whether other ONUs are transmitting upstream data and to avoid the collision from occurring.

There is still possibility that a plurality of ONUs find that no other ONUs are transmitting and decide to start transmission at the same time. With this scenario, each ONU may use an exponential backoff algorithm to determine a random delay to avoid the collision.

FIG. 2 shows a schematic view of another exemplary distributed controlled PON system. In the exemplary distributed controlled PON system in FIG. 2, remote node 201 includes N 2×2 couplers. Coupler k uses one output for transmitting upstream data from ONU k to OLT, and the other output for transmitting signal to next ONU k+1. In this manner, each ONU may listen to know whether the previous ONU is transmitting upstream data, and may start transmission when the previous ONU finishes transmission to avoid collision. In other words, each ONU must listen to hear that the previous ONU starts to transmit, wait until detecting the previous ONU finishes transmission, and then the ONU may start to transmit.

Because ONU is customer premises equipment (CPE), ONU has the right to determine when to switch on and off. Therefore, if ONU k of PON in FIG. 2 switches off, ONU k+1 will not be able to hear any data transmission of ONU k. In this scenario, ONU k+1 may keep waiting and the entire network may keep waiting and no ONU can start transmission.

FIG. 3 shows a schematic view of yet another exemplary distributed controlled PON system. In the exemplary distributed controlled PON system in FIG. 3, the remote node has a 3×N splitter 301 for broadcasting upstream signal to each downstream ONU. Through splitter 301, each ONU may receive messages to other ONUs. This PON system uses two channels, 1550 nm channel for transmitting downstream signal from OLT to ONUs, and 1310 nm channel for transmitting upstream signal from ONUs and broadcasting control signal to other ONUs. In other words, 1310 nm channel is a shared channel for upstream data and control data. The ONU system needs two high speed receivers for receiving 1550 nm channel and 1310 nm channel, and a high speed transmitter for transmitting on 1310 nm channel. Because the control and the ONU upstream share the same channel, each ONU still must wait until all ONUs finish transmitting before starting the new state broadcasting.

In current PON, the centralized network access control is entirely controlled by the OLT in the ONU network access time and access duration. The ONU cannot notify the OLT about the data amount to be transmitted. In comparison with ONUs in the distributed controlled PON system, the bandwidth utilization is low, the delay is high and no quality of service is guaranteed.

SUMMARY OF THE INVENTION

The exemplary disclosed embodiments of the present invention may provide a distributed controlled PON system and bandwidth control method thereof.

In an exemplary embodiment of the present invention, the disclosed is directed to a distributed controlled PON system. The PON system comprises an optical line terminal (OLT), plural optical network units (ONUs) and a splitter with combiner. Each ONU has a first Tx/Rx for respectively transmitting and receiving data packets on an upstream data channel and a downstream data channel, and a second Tx/Rx for transmitting and receiving control signals/commands on a control channel. Upstream data of each ONU is carried by the upstream data channel and sent to the OLT through the splitter with combiner. Downstream data of the OLT is carried by the downstream data channel and sent to corresponding ONUs through the splitter with combiner. With the control signals/commands carried by the control channel, the required information of network status among the ONUs is provided.

In another exemplary embodiment of the present invention, the disclosed is directed to a bandwidth control method, applicable to a distributed controlled PON system with a plurality of ONUs. In the bandwidth control method, each ONU transmits a respective control signal in a corresponding mini-slot on a control channel. Each respective control signal is assembled and then broadcast to each ONU. Before the beginning of a slot, each ONU executes a same dynamic bandwidth allocation (DBA) algorithm to determine which ONU has the right to use the slot without involving the OLT in the bandwidth control.

The foregoing and other features, aspects and advantages of the present invention will become better understood from a careful reading of a detailed description provided herein below with appropriate reference to the accompanying drawings.

DETAILED DESCRIPTION OF THE EXEMPLARY DISCLOSED EMBODIMENTS

The exemplary disclosed embodiments of the present invention may provide a distributed controlled passive optical network (PON) and bandwidth control method. In the disclosed design, the exemplary embodiments consider that the network access may be determined by the ONUs, instead of transmitting the control signal to the remote OLT. This enables the time-sensitive signaling data to be rapidly uplinked to the OLT without the constraint that the ONU must wait for a longer time to report the data amount to be transmitted. In addition, the exemplary embodiments may also be implemented with low-cost mechanism.

Figure 1:
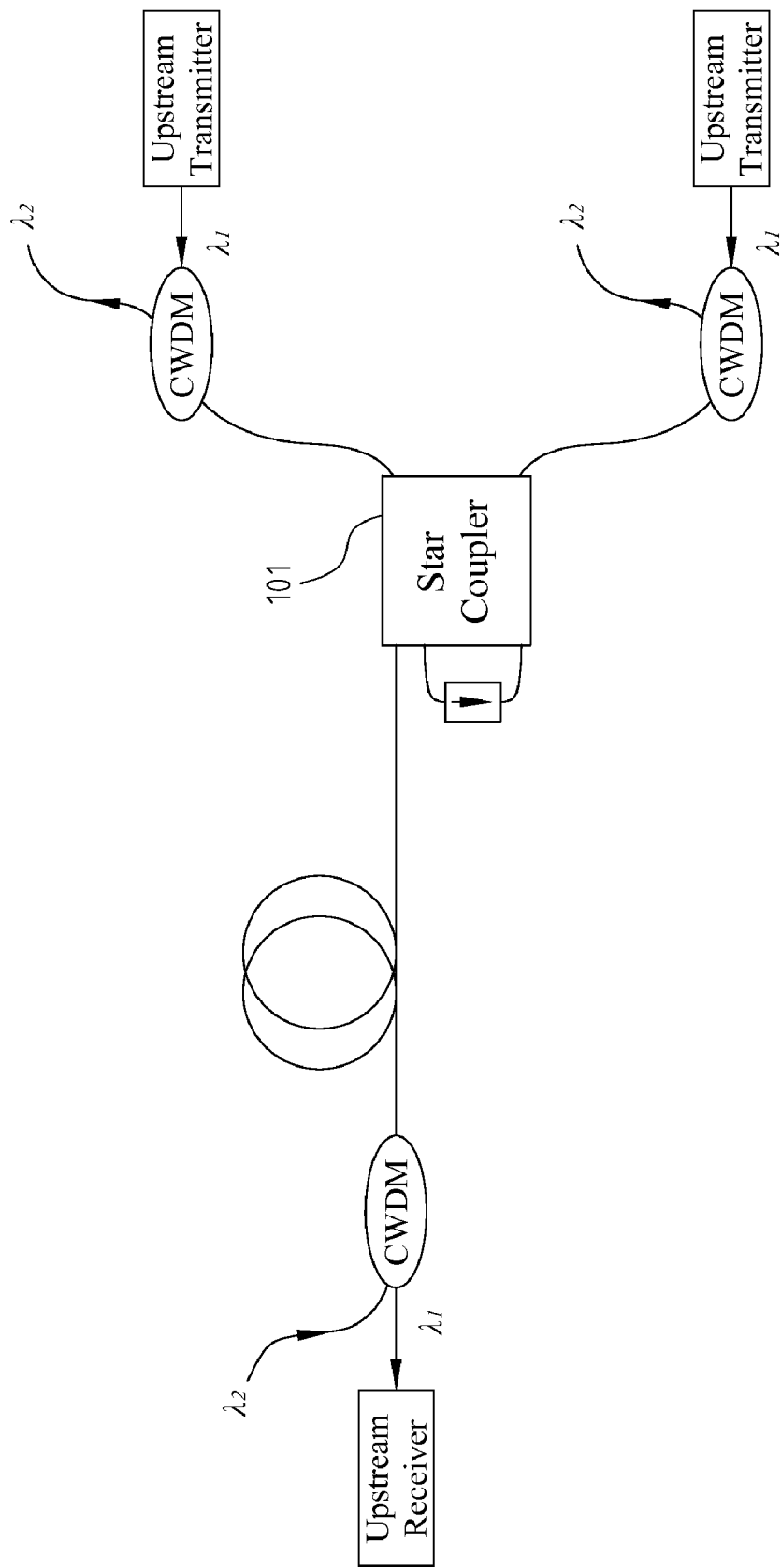
FIG. 1 shows a schematic view of an exemplary distributed controlled PON.
Figure 2:
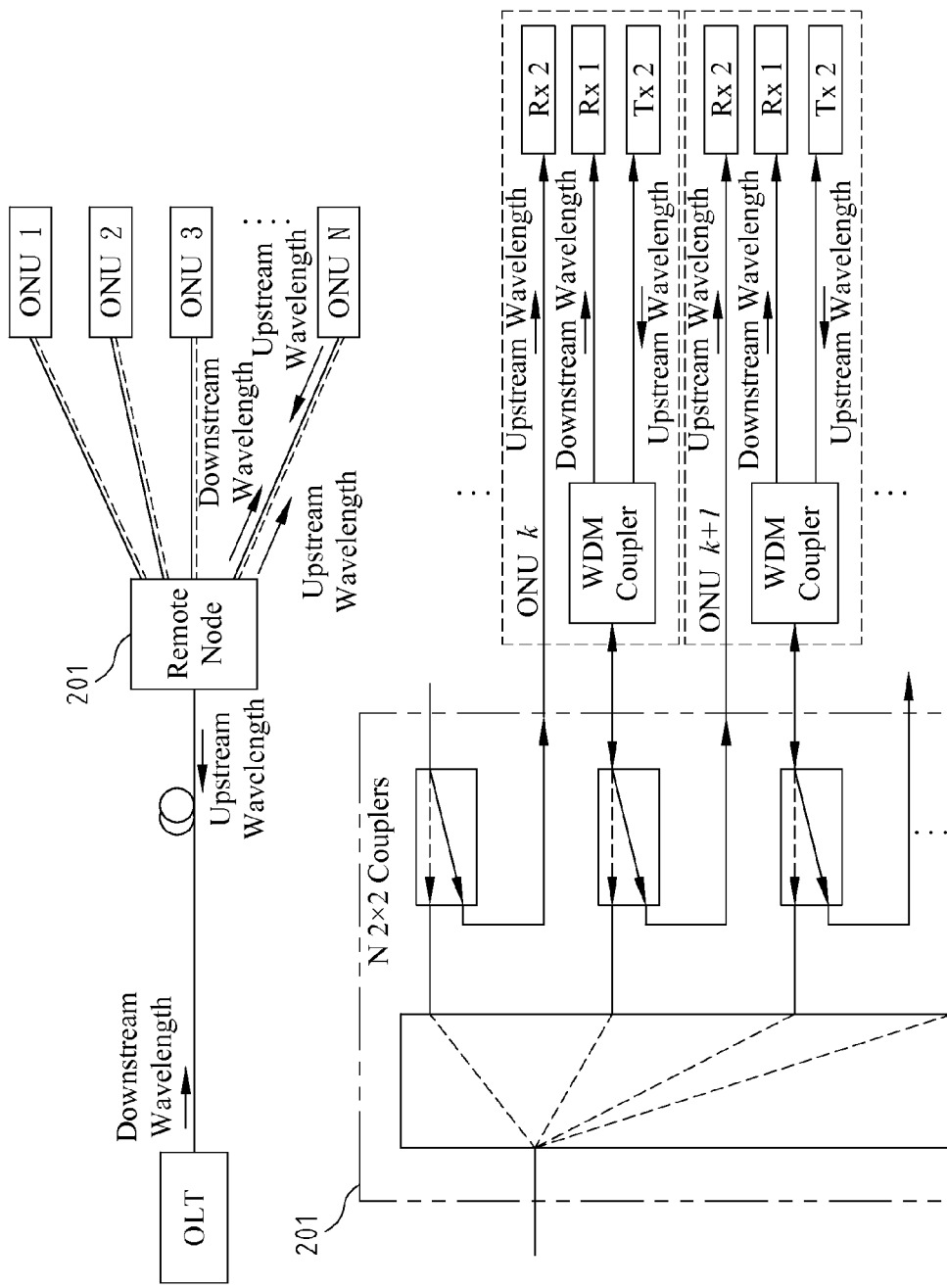
FIG. 2 shows a schematic view of another exemplary distributed controlled PON.
Figure 3:
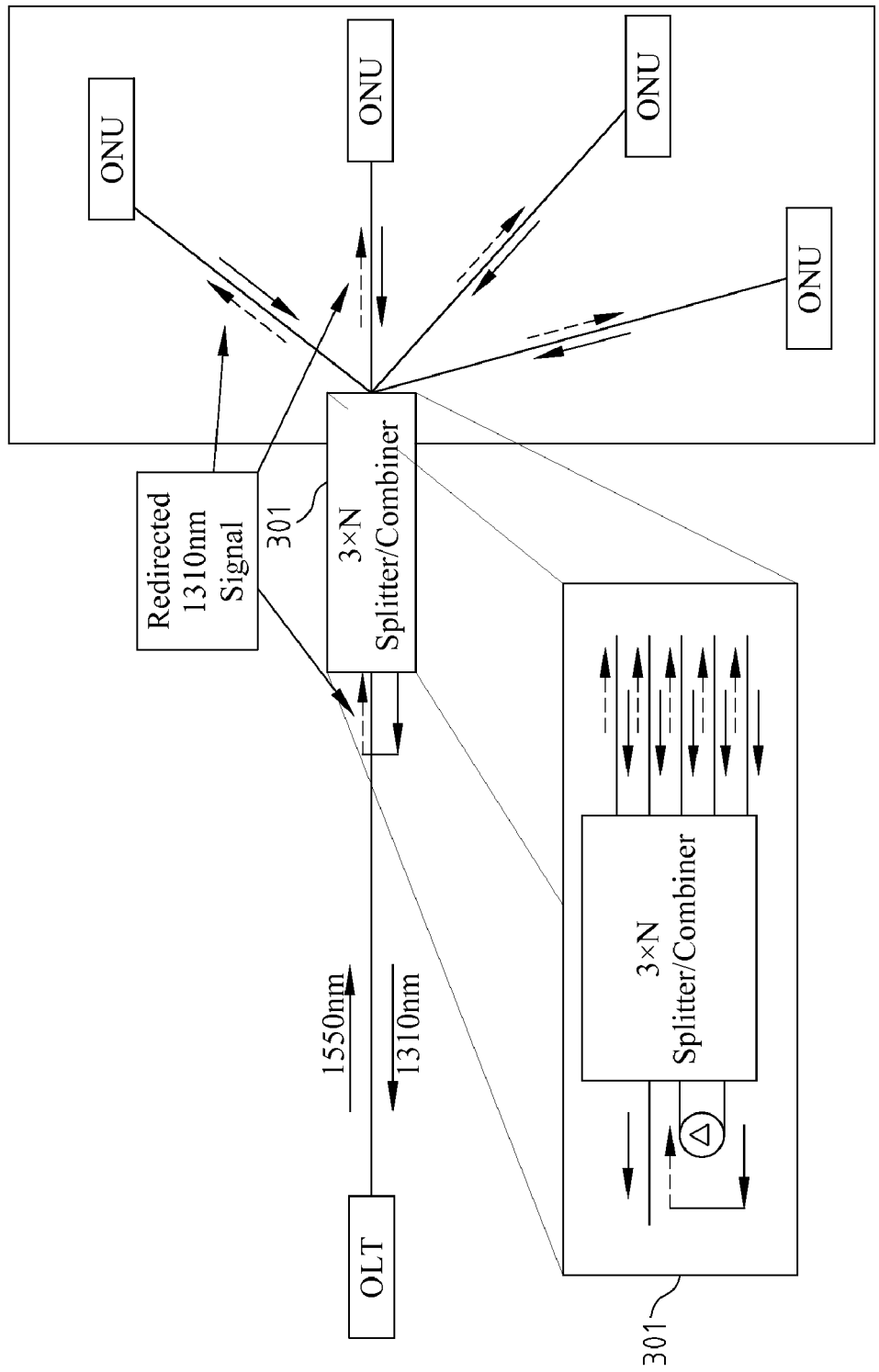
FIG. 3 shows a schematic view of yet another exemplary distributed controlled PON.
Figure 4:
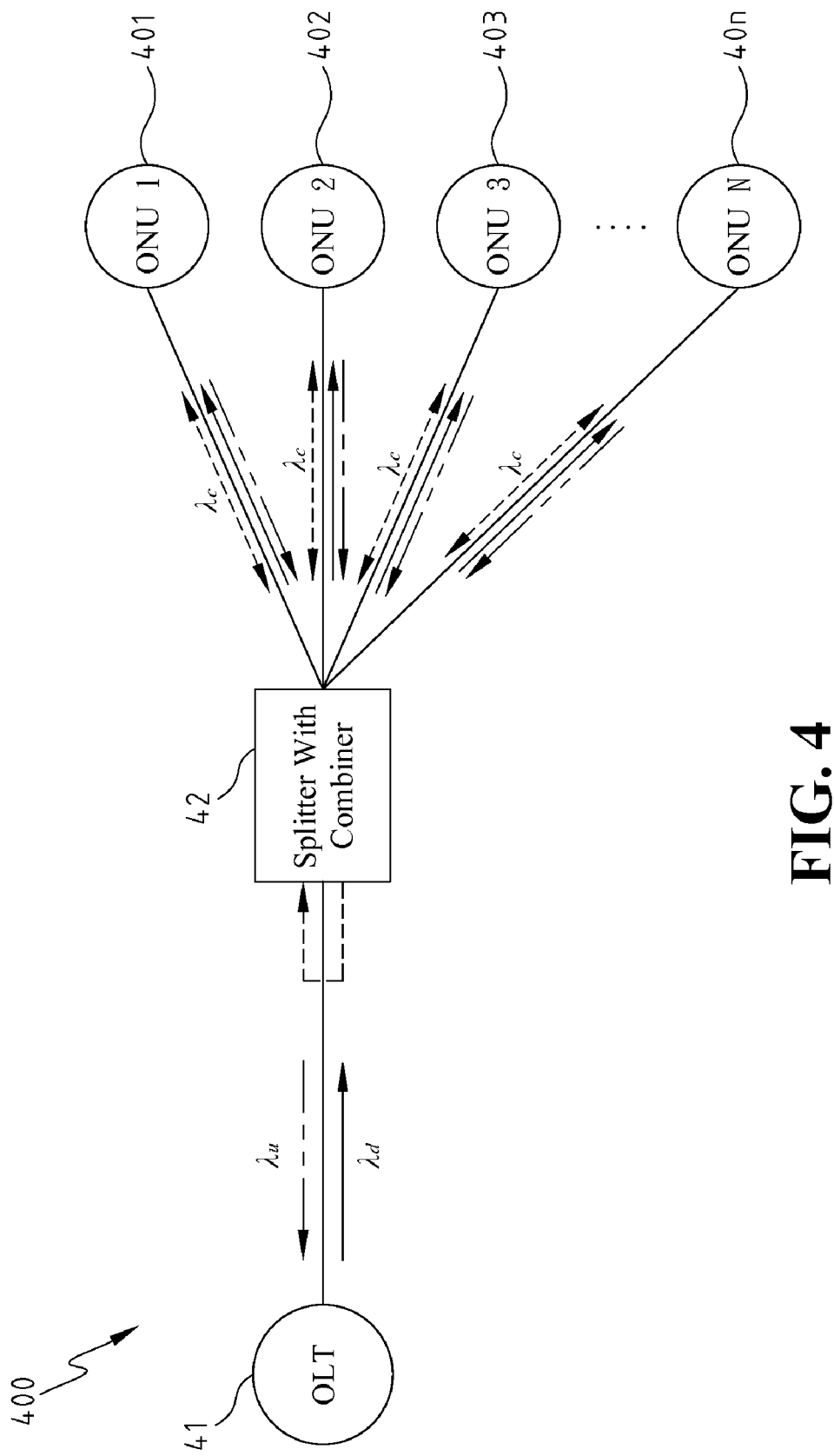
FIG. 4 shows a schematic view of an exemplary distributed controlled PON, consistent with certain disclosed embodiments of the present invention.

FIG. 4 shows a schematic view of an exemplary distributed controlled PON, consistent with certain disclosed embodiments of the present invention. Referring to FIG. 4, PON system structure 400 comprises a plurality of ONUs 401-40n, an OLT 41, and a splitter with combiner 42. Each of ONUs 401-40n has a first Tx/Rx for transmitting and receiving data packets on the data channels $\lambda_u$ and $\lambda_d$, and a second Tx/Rx for transmitting and receiving control signals on a control channel $\lambda_c$, where $\lambda_u$ indicates the upstream data channel (from ONU to OLT) and $\lambda_d$ indicates the downstream data channel (from OLT to ONU).

In PON system structure 400, the upstream data of each ONU is carried by the upstream data channel $\lambda_u$ and is transmitted through splitter with combiner 42 to OLT 41. The downstream data from OLT 41 is carried by the downstream data channel $\lambda_d$, and is transmitted through splitter with combiner 42 to each ONU. With the control signals carried by control channel $\lambda_c$, the network state information required by the N ONUs may be provided.

In PON system structure 400, the optical wavelength channel is divided into control channel and data channel, where a low speed independent control channel may be selected for transmitting and receiving control signals, and high speed data channel may be used for transmitting and receiving data packets. For example, in the control channel, the transmission rate for the control signals is 125 Mbps, while, in the data channel, the transmission rate for data packets is 1.25 Gbps. Because the control signal is independent of the upstream data channel, the frequency of updating the control state may be increased. When a time-sensitive data waits, with the timely update of control signal to learn the bandwidth control state, the time-sensitive data may have the opportunity to be transmitted.

According to the present invention, in PON system structure 400, the network access is determined by the ONUs, instead of OLT. In other words, based on the network state information required by the ONUs and provided by control channel $\lambda_c$, PON system uses a distributed bandwidth control method so that the OLT need not be involved in the bandwidth control.

Figure 5:
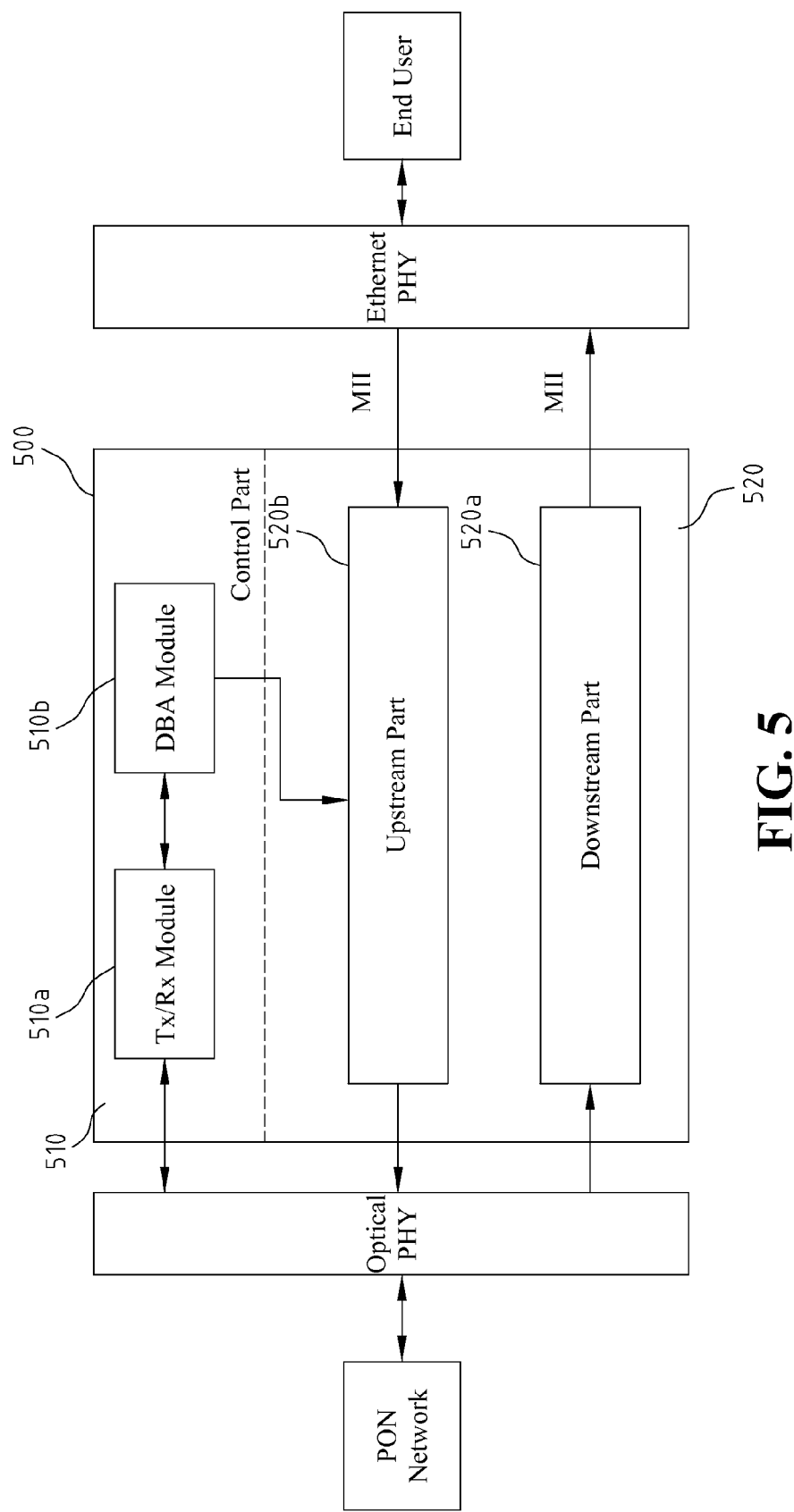
FIG. 5 shows a schematic view of an exemplary ONU prototype system architecture, consistent with certain disclosed embodiments of the present invention.

FIG. 5 shows a schematic view of an exemplary ONU prototype system formed by a plurality of ONUs, consistent with certain disclosed embodiments of the present invention. Referring to FIG. 5, ONU prototype system 500 may be divided into a control part 510 and a data packet transmission/receiving part 520. Control part 510 includes a Tx/Rx module 510a and a dynamic bandwidth allocation (DBA) module 510b. Control part 510a is to implement the control on the data transmission on the data channel and on the low speed (such as 125 Mbps) and independent control channel. Data packet transmission/receiving part 520 may be divided, based on the relation with OLT, into downstream (from OLT to ONU) part 520a and upstream (from ONU to OLT) part 520b.

Downstream part 520a includes an optical receiving interface, PON media access control (MAC) mechanism and related buffer, and organizes the received data through media independent interface (MII) into frame, such as Ethernet frame, and transmits to end user through network physical layer, such as Ethernet PHY. Upstream part 520b transmits the frame of the end user through MII to, such as Ethernet MAC mechanism. The framer then stores the frame to the buffer waiting for the DBA module 510b to transmit to OLT.

An exemplary implementation of ONU prototype system 500 may be, for example, using Xilinx FPGA XC4VLX60, and the gate count used by the system is 12864 for upstream and 10517 for downstream.

Figure 6:
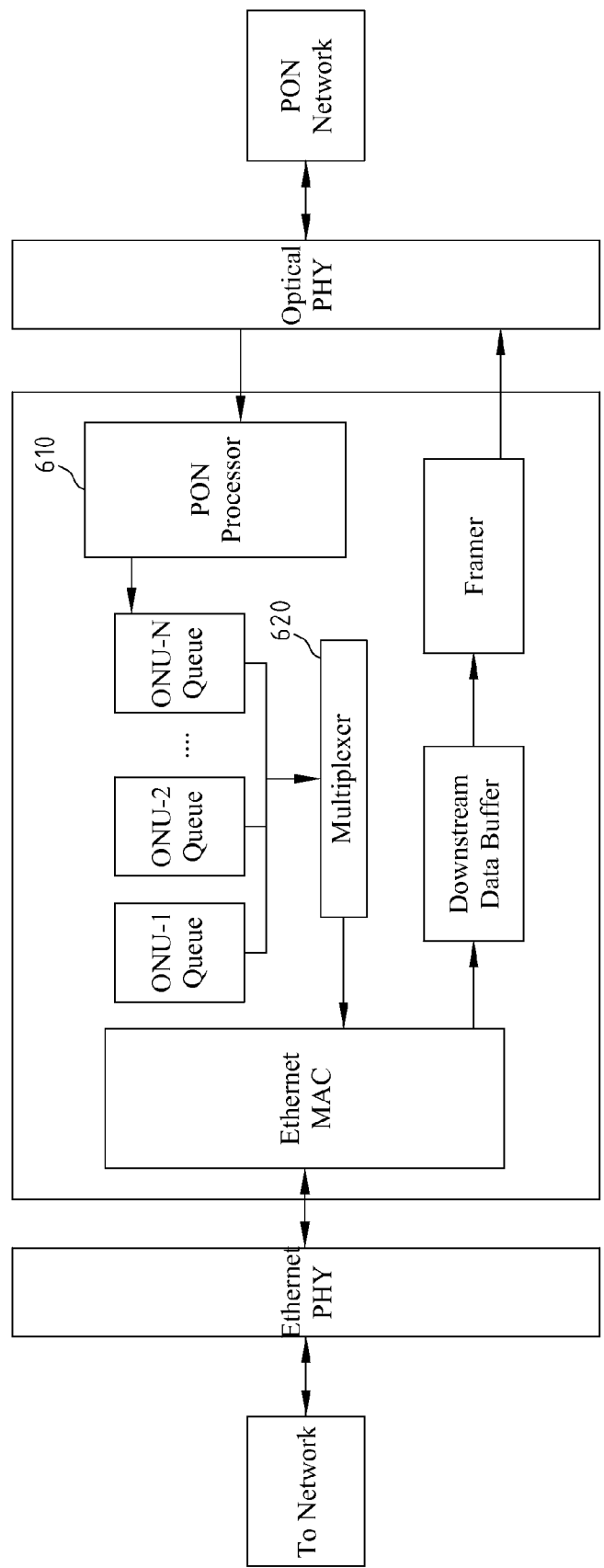
FIG. 6 shows a schematic view of an exemplary OLT system architecture, consistent with certain disclosed embodiments of the present invention.

FIG. 6 shows a schematic view of an exemplary OLT system architecture, consistent with certain disclosed embodiments of the present invention. Referring to FIG. 6, the upstream frame is received and reorganized into the network frame, such as Ethernet frame, by PON processor 610, and then is transmitted to a corresponding OLT buffer. Then, the frame passes through a multiplexer 620 to, such as Gigabit framer, through GMII to the back end network. The downstream frame does not need any reorganization. The ONU identity is filled into the downstream frame, and the frame can be sent to PON.

According to the present invention, each ONU using DBA module 510b uses a same bandwidth allocation algorithm for bandwidth control. Although bandwidth control is computed by each ONU independently, the ONUs may reach a unanimous and precise decision. To obtain precise bandwidth control, in PON system structure 400, each wavelength channel is divided into a plurality of fixed length slots according to time. For each slot, the bandwidth allocation algorithm is executed once, and the weight is used as a basis to determine which ONU may transmit for bandwidth allocation. The present invention also takes into account the highly bursty network access to meet the delay and jitter needs of the real time signals, as well as short time fairness and long term fairness. The following describes the DBA algorithm.

First, weight $w_i$ is defined as the bandwidth ratio allocated to each ONU, and the sum of the weights of all ONUs is equal to 1. DBA module 510b in each ONU has a table recording all the state information of all ONUs, including two fields ($Q_i$, $S_i$), where $Q_i$ records the current queue size in ONU i, and $S_i$ records the current potential value of ONU i for providing to DBA algorithm for comparison and determining the ONU allowed to transmit.

Figure 7:
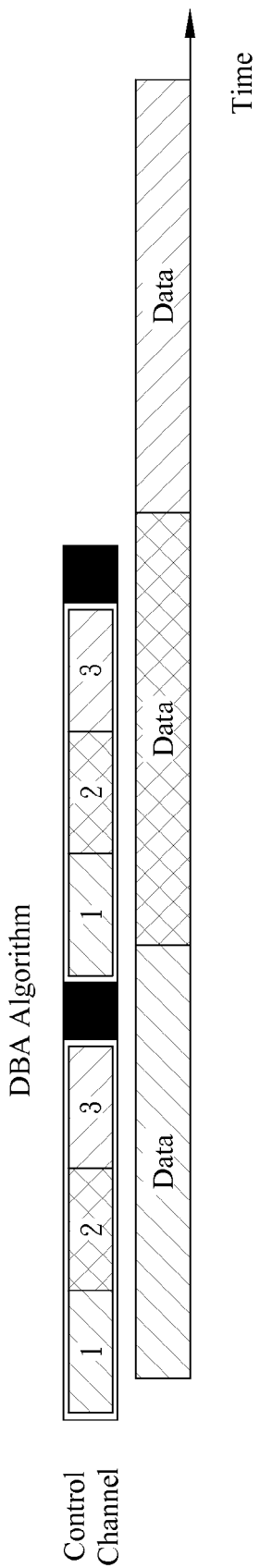
FIG. 7 shows an exemplary schematic view of each ONU executing a DBA algorithm once before each slot, consistent with certain disclosed embodiments of the present invention.

In each data channel, each slot may include a data packet. In control channel, each slot is divided into a plurality of control mini-slots. Each ONU is allocated a control mini-slot to broadcast its own control message ($Q_i$, $S_i$). FIG. 7 shows an exemplary schematic view of each ONU executing a DBA algorithm once before each slot, consistent with certain disclosed embodiments of the present invention. Referring to FIG. 7, in the control channel, each slot is divided into three control mini-slots, and ONU1, ONU2, ONU 3 are allocated control mini-slot 1, control mini-slot 2 and control mini-slot 3, respectively, to broadcast its own control message. Before the beginning of each slot, ONU 1, ONU 2 and ONU 3 execute the DBA algorithm to determine which ONU is allowed to transmit.

Figure 8A:
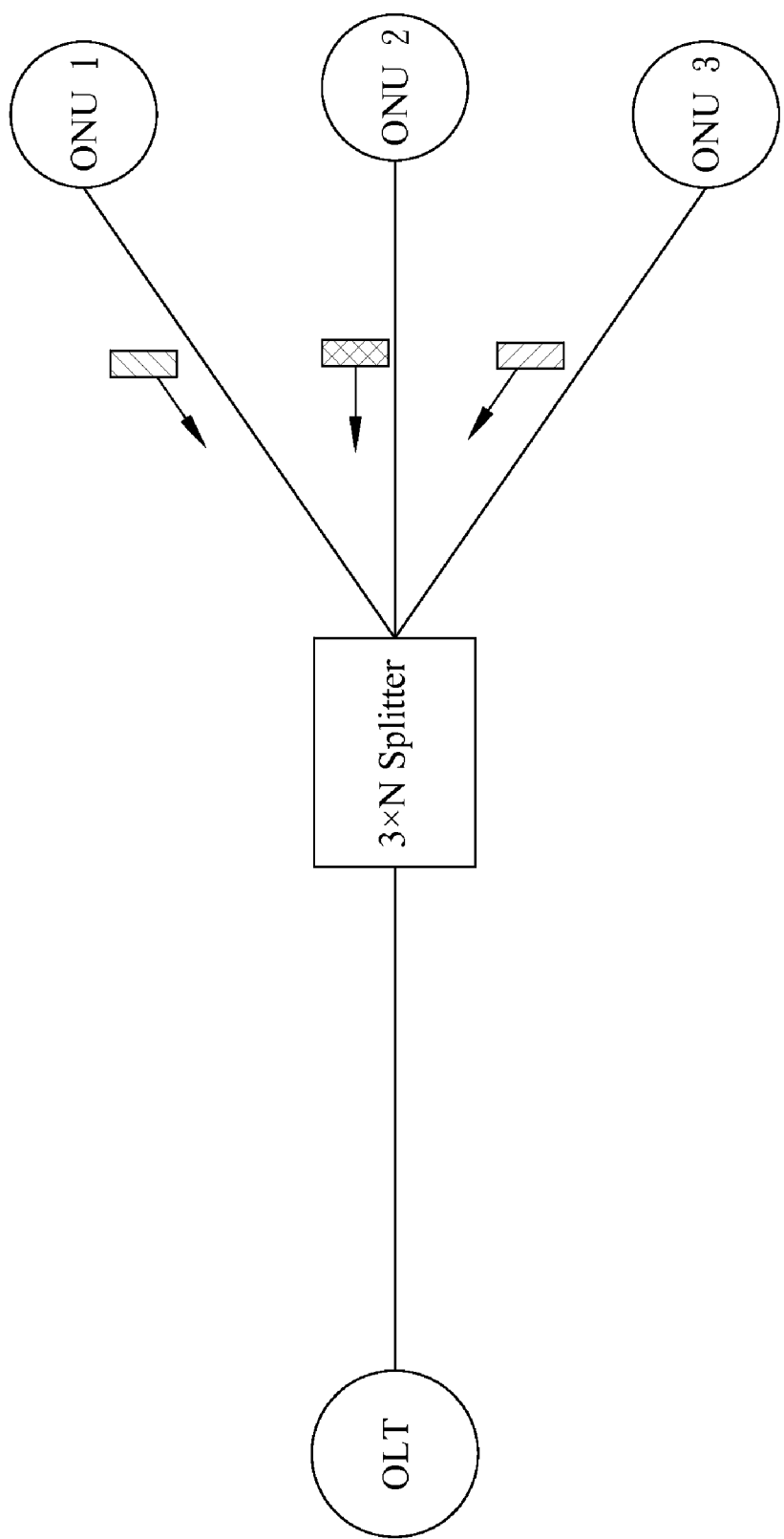
FIG. 8a shows an exemplary schematic view of each ONU sending own control message on the control channel during a corresponding mini control slot following the example in FIG. 7, consistent with certain disclosed embodiments of the present invention.
Figure 8B:
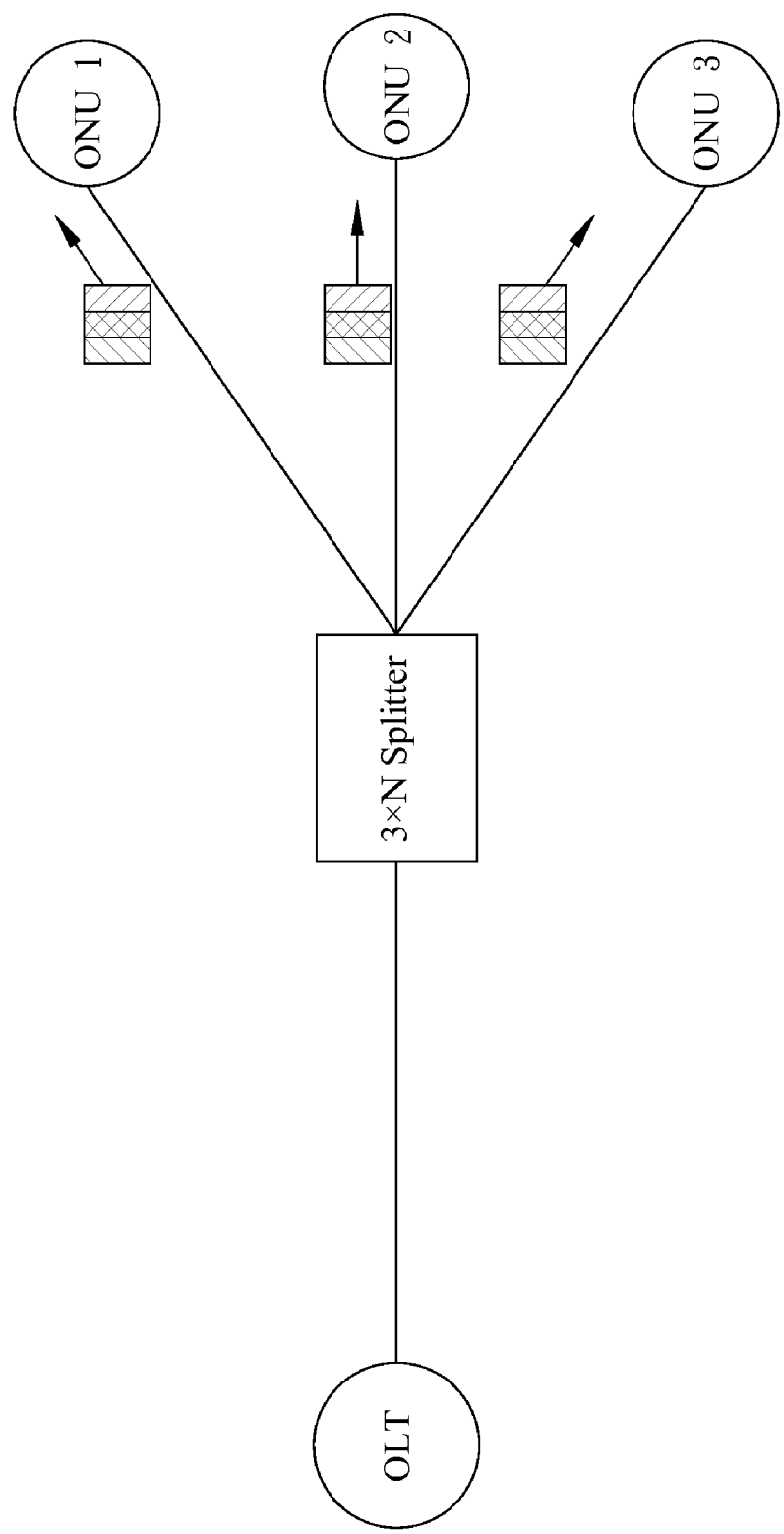
FIG. 8b shows an exemplary schematic view of individual control messages being combined and broadcast to each ONU, consistent with certain disclosed embodiments of the present invention.

Following the exemplary embodiment in FIG. 7, FIGS. 8a-8c show an exemplary operation flow of a bandwidth control method for the PON system, consistent with certain disclosed embodiments of the present invention. FIG. 8a shows each ONU transmitting its own control message through control channel during a corresponding control mini-slot, consistent with certain disclosed embodiments of the present invention. As shown in FIG. 8a, ONU 1, ONU 2, and ONU 3 transmit their own control messages through the control channel during mini-slot 1, mini-slot 2 and mini-slot 3 to a splitter with combiner, such as a 3×N splitter with combiner. FIG. 8b shows the individual control messages being combined and broadcast to each ONU, consistent with certain disclosed embodiments of the present invention. As shown in FIG. 8b, all the control messages are combined by the splitter with combiner, and broadcast to ONU 1, ONU 2 and ONU 3. These control messages do not need to be transmitted to remote OLT.

In each mini-slot, when each ONU receives control messages, the table is updated according to the control message. Broadcast messages are synchronized among all ONUs.

Figure 8C:
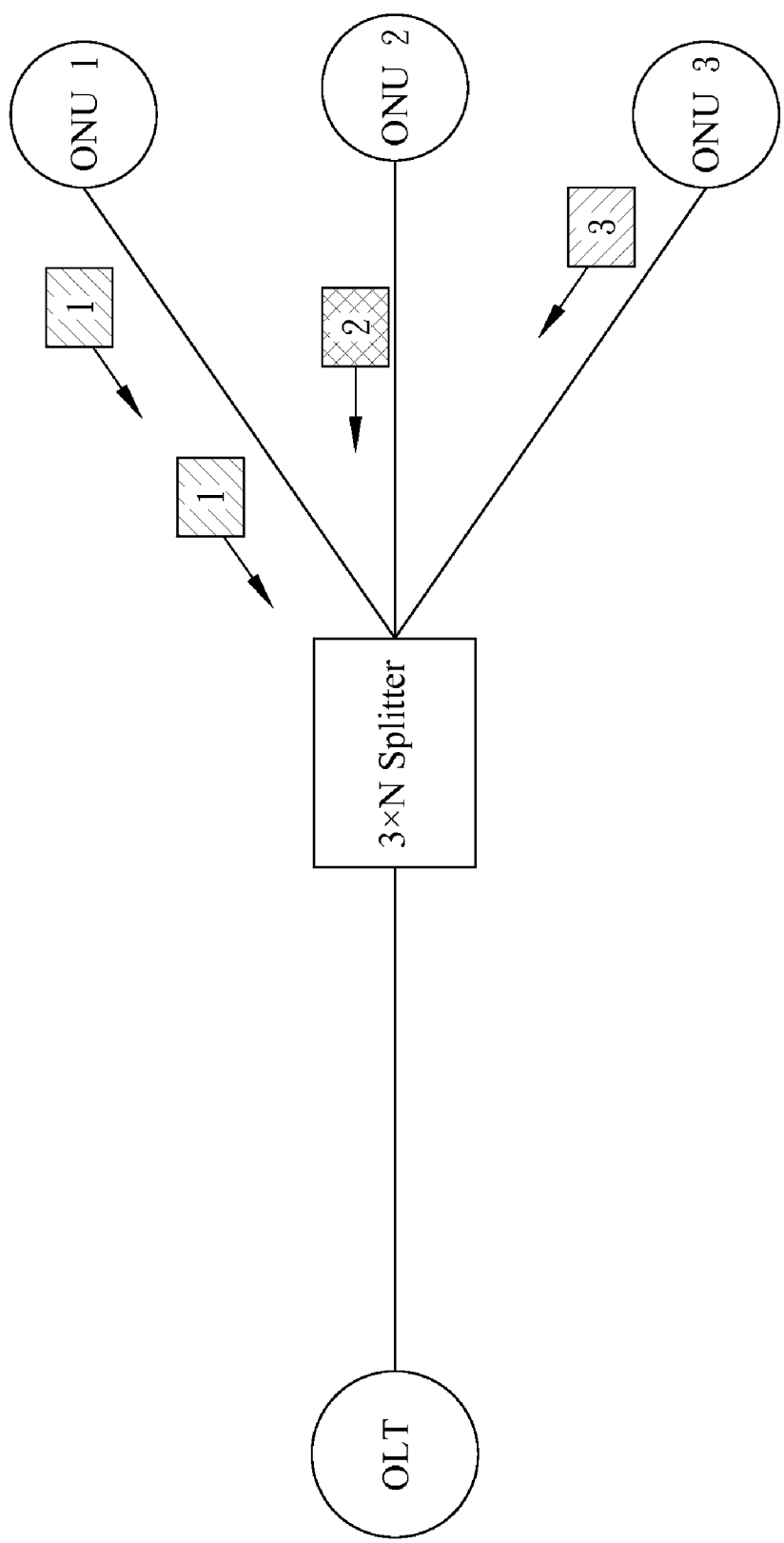
FIG. 8c shows an exemplary schematic view of each ONU executing a same DBA algorithm before each slot and based on results of DBA algorithm to determine which ONU is allowed to transmit during the slot, consistent with certain disclosed embodiments of the present invention.

Before the beginning of each slot, each ONU executes the same DBA algorithm. Based on the execution result, one of the ONUs is determined to have the right to use the slot. In other words, ONU 1, ONU 2 and ONU 3 use the messages in the table to execute the same DBA algorithm to determine which ONU is allowed to transmit data and the ONU transmits data packets sequentially. As shown in FIG. 8c, ONU 1, ONU 2 and ONU 3 execute the same DBA algorithm to determine the time each ONU may transmit, where sequentially, ONU 1 transmits a data packet, ONU 2 transmits a data packet, ONU 1 transmits a data packet again and finally ONU 3 transmits a data packet.

Therefore, as can be seen from FIGS. 8a-8c, in the PON system of the present invention, the bandwidth control is distributed and the OLT is not involved in the bandwidth control.

Figure 8D:
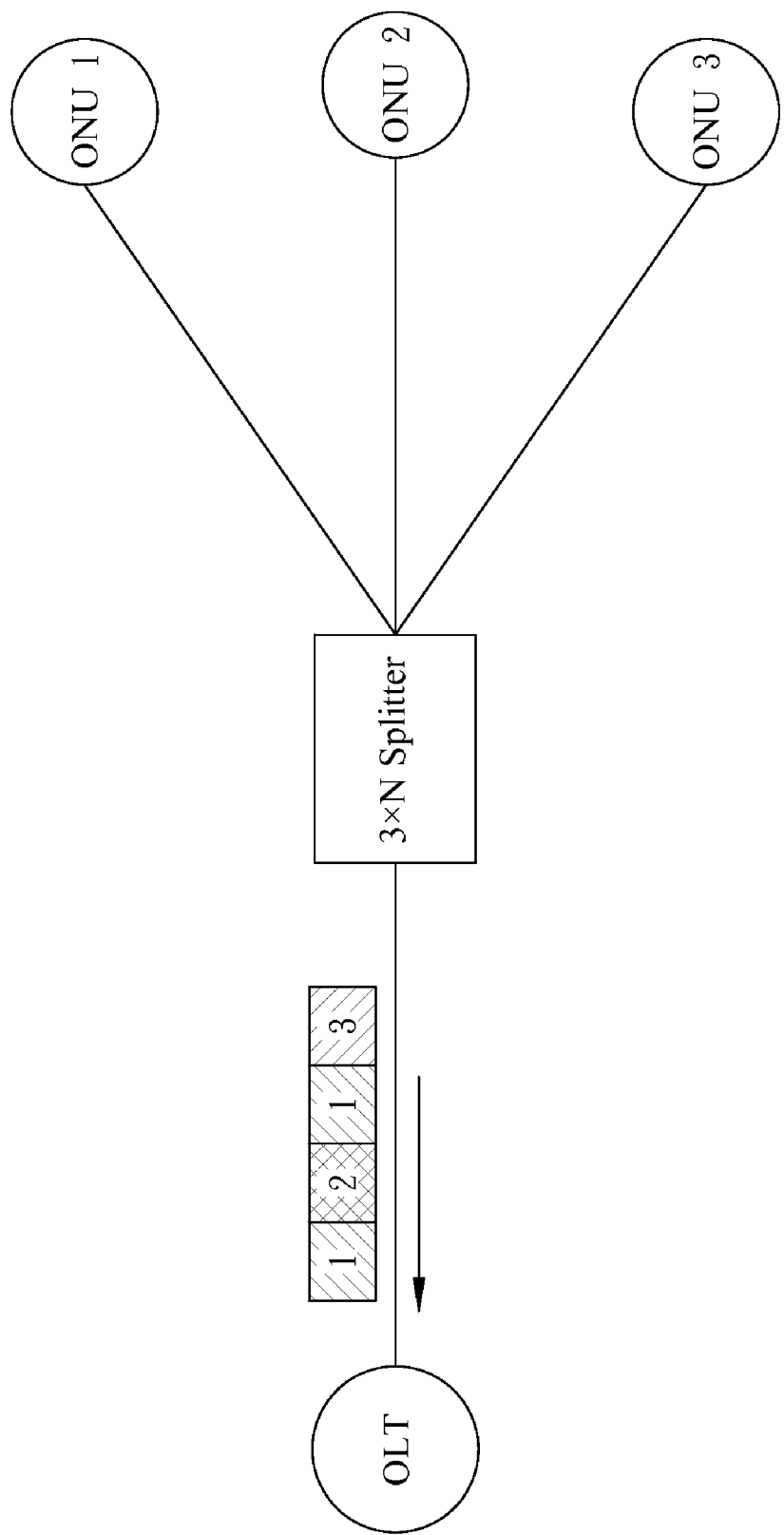
FIG. 8d shows an exemplary schematic view illustrating ONUs allowed to transmit data packets sequentially and immediately upstream the data packets to OLT, consistent with certain disclosed embodiments of the present invention.

Afterwards, as shown in FIG. 8d, the four data packets are transmitted upstream to OLT through the splitter with combiner.

Figure 9:
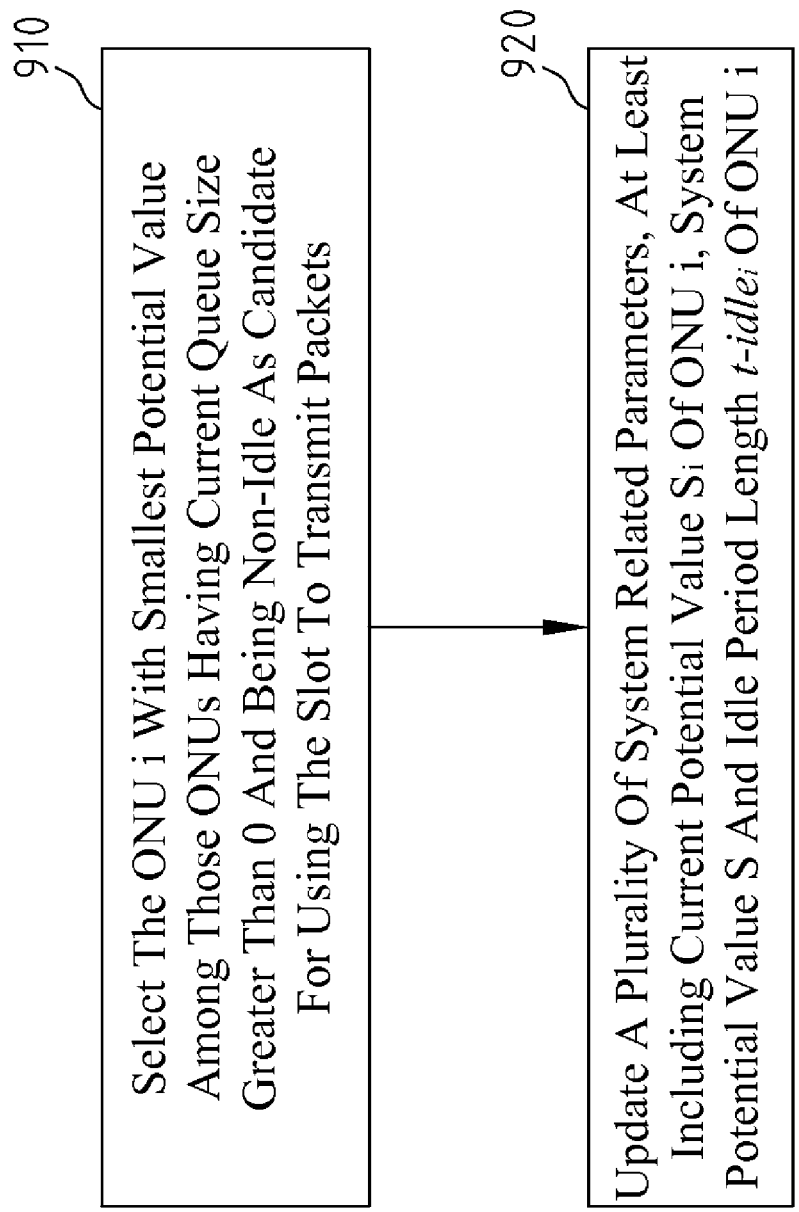
FIG. 9 shows an exemplary schematic view of two main parts of DBA algorithm, consistent with certain disclosed embodiments of the present invention.

The following describes how each ONU executes DBA algorithm before each slot. FIG. 9 shows an exemplary schematic view of two main parts of DBA algorithm, consistent with certain disclosed embodiments of the present invention.

Referring to FIG. 9, step 910 is to select the ONU i with a smallest potential value among those ONUs having a current queue size greater than 0 and being non-idle as the candidate for using the slot to transmit packets. Step 920 is to update the system related parameters, at least including $S_i$ of ONU i, global system potential S, and idle period length t-idle$_i$ of ONU i.

Figure 10:
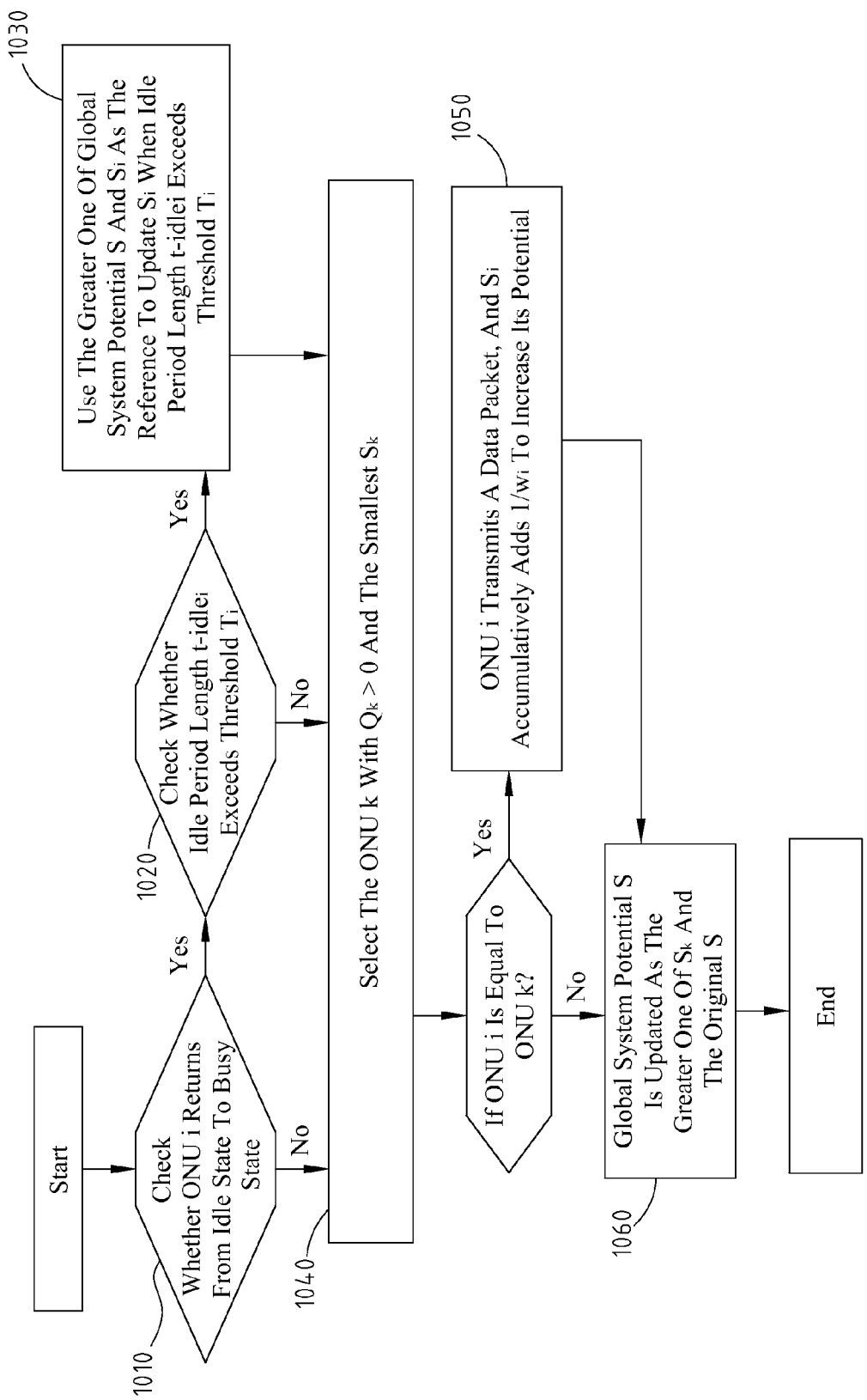
FIG. 10 shows an exemplary flowchart illustrating the detailed operation of DBA algorithm by each ONU before each slot, consistent with certain disclosed embodiments of the present invention.

FIG. 10 shows an exemplary flowchart illustrating the detailed operation of DBA algorithm by each ONU before each slot, consistent with certain disclosed embodiments of the present invention.

The update of $S_i$ is triggered by two events. The first event is that ONU i is the ONU being allowed to use the slot (said ONU k) and when ONU i completes packet transmission. The second event is when t-idle$_i$ of ONU i exceeds the pre-defined threshold $T_i$ and returns from the idle state to the busy state (i.e., new packet is generated). As shown in FIG. 10, at the beginning, whether ONU i returns from idle state to busy state is checked, as shown in step 1010. If so, whether idle period length t-idle$_i$ exceeds threshold $T_i$ is checked, as shown in step 1020. When t-idle$_i$ exceeds threshold $T_i$, the greater one of global system potential S and $S_i$ is used as the reference to update $S_i$, as shown in Step 1030. In other words, when ONU i returns from idle state to busy state and the idle time exceeds the pre-defined threshold, the greater one of global system potential S and $S_i$ is used to update $S_i$.

When ONU i is not returning from idle state to busy state or the idle time exceeds the pre-defined threshold and ONU i is returning to busy state, the ONU k with $Q_k$>0 and the smallest $S_k$ is selected, as shown in step 1040. If ONU i is equal to ONU k, ONU i transmits a data packet, and $S_i$ accumulatively adds $1/w_i$ to increase its potential, as shown in step 1050. If ONU i is not equal to ONU k, or after $S_i$ accumulatively adds $1/w_i$ to increase its potential, global system potential S is updated as the greater one of $S_k$ and the original S, as shown in step 1060. The update of step 1060 is executed at the end of each slot.

If currently ONU i has $Q_i>0$, t-idle$_i$ is updated as 0; otherwise, t-idle$_i$ is incremented by 1.

Figure 11:
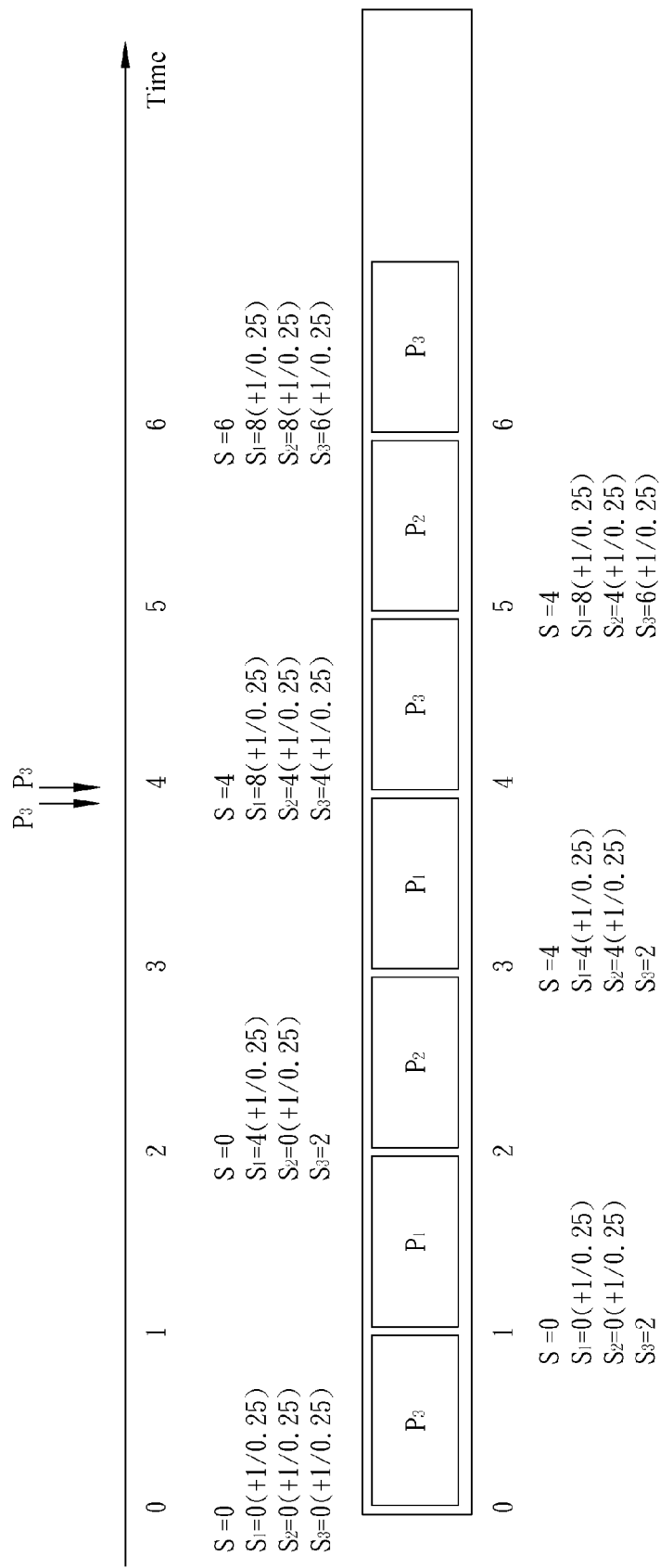
FIG. 11 shows an exemplary schematic view of a working example of executing DBA algorithm, consistent with certain disclosed embodiments of the present invention.

FIG. 11 shows an exemplary schematic view of a working example of executing DBA algorithm, consistent with certain disclosed embodiments of the present invention. The working example in FIG. 11 assumes that bandwidth allocation ratio allocated to non-idle ONU 1, ONU 2 and ONU 3 is 0.25, 0.25, and 0.5, respectively. In other words, the weights $\{w_1, w_2, w_3\}$ of ONU1, ONU2, ONU 3 are $\{0.25, 0.25, 0.5\}$ and pre-defined threshold $\{T_i, T_2, T_3\}=\{0, 0, 2\}$.

Before the beginning of slot 0, assume that $Q_1$, $Q_2$, $Q_3$ of ONU 1 ONU2 and ONU 3 are 10, 10, 1, respectively, and global system potential S=0. Then, according to the operation of DBA algorithm, as shown in FIG. 11, the computing results are S=0, $S_1$=0(+1/0.25), $S_2$=0(+1/0.25), $S_3$=0(+1/0.5). Therefore, ONU 3 with the smallest potential sends a data packet P3, and $Q_3$ is decremented from 1 to 0.

Before the beginning of slot 1, S=0, $S_1$=0(+1/0.25), $S_2$=0 (+1/0.25), $S_3$=2. Based on the aforementioned DBA algorithm, as shown in FIG. 11, ONU 1 has $Q_1>0$ and the smallest potential, and sends a data packet P1. $S_1$ is incremented by 1/0.25, i.e., updated as $S_1$=4(+1/0.25) t-idle$_3$ for ONU 3 is equal to 1.

Before the beginning of slot 2, S=0, $S_1$=4(+1/0.25), $S_2$=0 (+1/0.25), $S_3$=2. Based on the aforementioned DBA algorithm, as shown in FIG. 11, ONU 2 that has $Q_2>0$ and the smallest potential sends a data packet P2. $S_2$ is incremented by 1/0.25, i.e., updated as $S_2$=4(+1/0.25). S is updated as max $\{S, S_2\}$=4. t-idle$_3$ for ONU 3 is equal to 2.

Before the beginning of slot 3, S=4, $S_1$=4(+1/0.25), $S_2$=4 (+1/0.25), $S_3$=2. Based on the aforementioned DBA algorithm, as shown in FIG. 11, ONU 1 has $Q_1>0$ and the smallest potential, and sends a data packet P1. $S_1$ is incremented by 1/0.25, i.e., updated as $S_1$=8(+1/0.25).

Before the beginning of slot 4, ONU 3 receives two data packets P3, and returns from idle state to busy state. t-idle$_3$ for ONU 3 exceeds pre-defined threshold $T_3$=2. Therefore, $S_3$ is updated as the greater of $S_3$ and S i.e., $S_3$=max{S, $S_3$}=max{4, 2}. S=4, $S_1$=8(+1/0.25), $S_2$=4(+1/0.25), and $S_3$ is incremented by 1/0.5, i.e., $S_3$=4(+1/0.5). Based on the aforementioned DBA algorithm, as shown in FIG. 11, ONU 3 has $Q_3>0$ and the smallest potential, and sends a data packet P3. $S_3$ is incremented by 1/0.5, i.e., updated as $S_3$=6(+1/0.5).

Before the beginning of slot 5, S=4, $S_1$=8(+1/0.25), $S_2$=4 (+1/0.25), $S_3$=6(+1/0.5). Based on the aforementioned DBA algorithm, as shown in FIG. 11, ONU 2 has $Q_2>0$ and the smallest potential, and sends a data packet P2. $S_2$ is incremented by 1/0.25, i.e., updated as $S_2$=8(+1/0.25).

Before the beginning of slot 6, S=6, $S_1$=8(+1/0.25), $S_2$=8 (+1/0.25), $S_3$=6(+1/0.5). Based on the aforementioned DBA algorithm, as shown in FIG. 11, ONU 3 has $Q_3>0$ and the smallest potential, and sends a data packet P3. All the right to access the slot is also determined by the DBA algorithm before each slot, and remaining description is the same as above and thus is omitted here.

From the above description, it may be seen that the DBA algorithm uses the alternating updating of system potential S and $S_i$ of ONU i to avoid the long time monopolizing the bandwidth by an ONU so as to achieve the fair bandwidth allocation based on weight $w_i$. On the other hand, through the design of t-idle$_i$ of ONU i and pre-defined threshold $T_i$, the long term fairness may be maintained for ONUs with fluctuating data amount and achieve bursty traffic adaptation.

Therefore, an appropriate threshold $T_i$ may be designed for different traffic type to meet different service quality demands.

Figure 12:
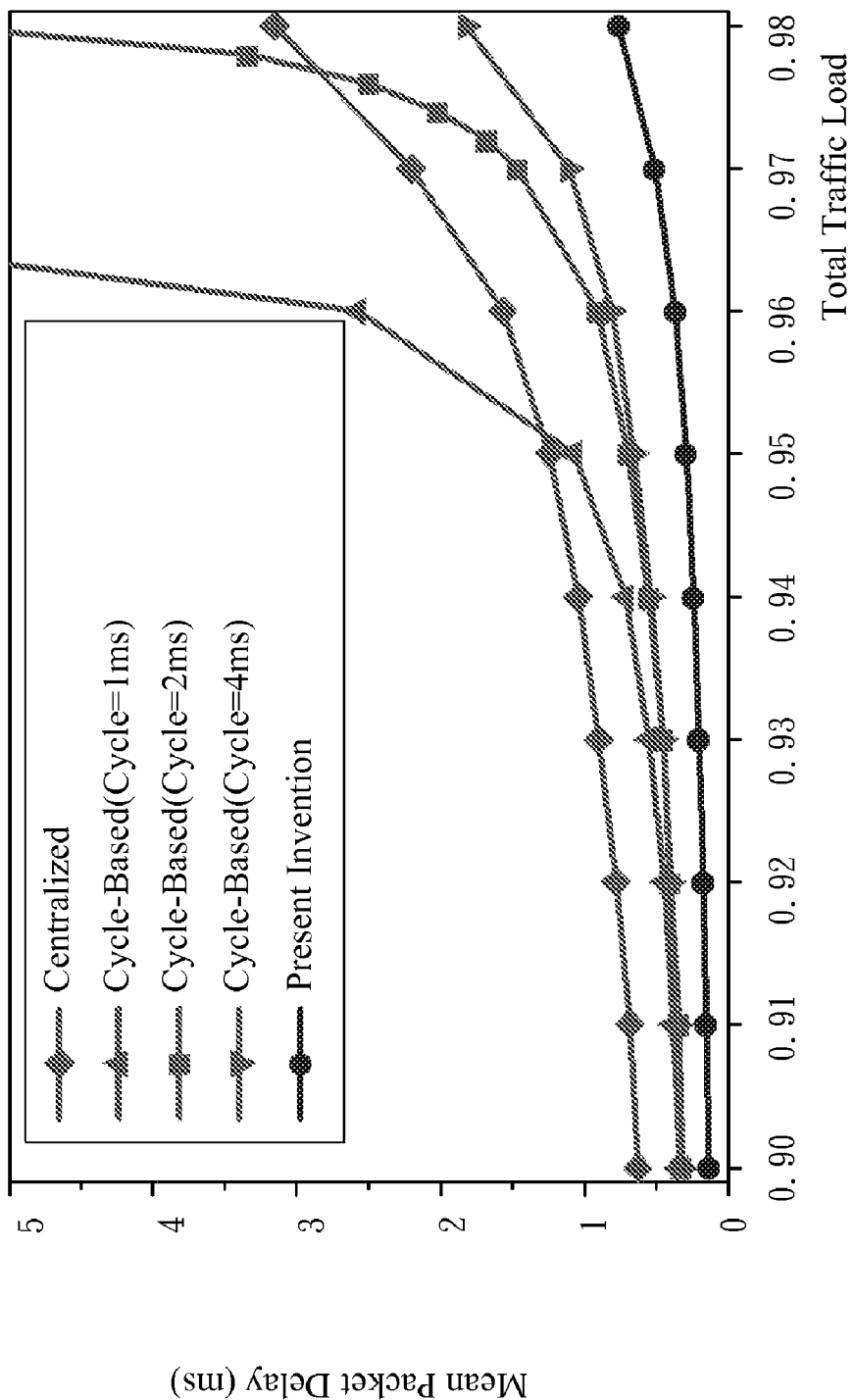
FIG. 12 shows a schematic view of an exemplary simulation result of the performances of the centralized controlled DBA, cycle-based distributed controlled DBA and slotted-based distributed controlled DBA of the present invention.

FIG. 12 shows an exemplary simulation result of the performances of the centralized controlled DBA, cycle-based distributed controlled DBA and slotted-based distributed controlled DBA of the present invention, where the X-axis represents total traffic load and the Y-axis represents mean packet delay. The simulated environment is defined as: 32 ONUs, distance between ONUs and OLT is 20 km, and each ONU has traffic with equal amount of burstiness.

As shown in FIG. 12, when total traffic load is greater than 0.9, the centralized controlled DBA requires 40 km of transmission time to transmit the packets, equal to the round trip time, to wait for OLT round-robin polling and reply with the needs. Plus the round-robin polling effect, the total delay is 0.5 ms. If the cycle-based DBA has a too small size per cycle, the control message transmission cost will increase and affect the transmission efficiency in high load. The distributed controlled DBA of the present invention has less than 0.8 ms delay even in high load, such as 0.98.

Figure 13:
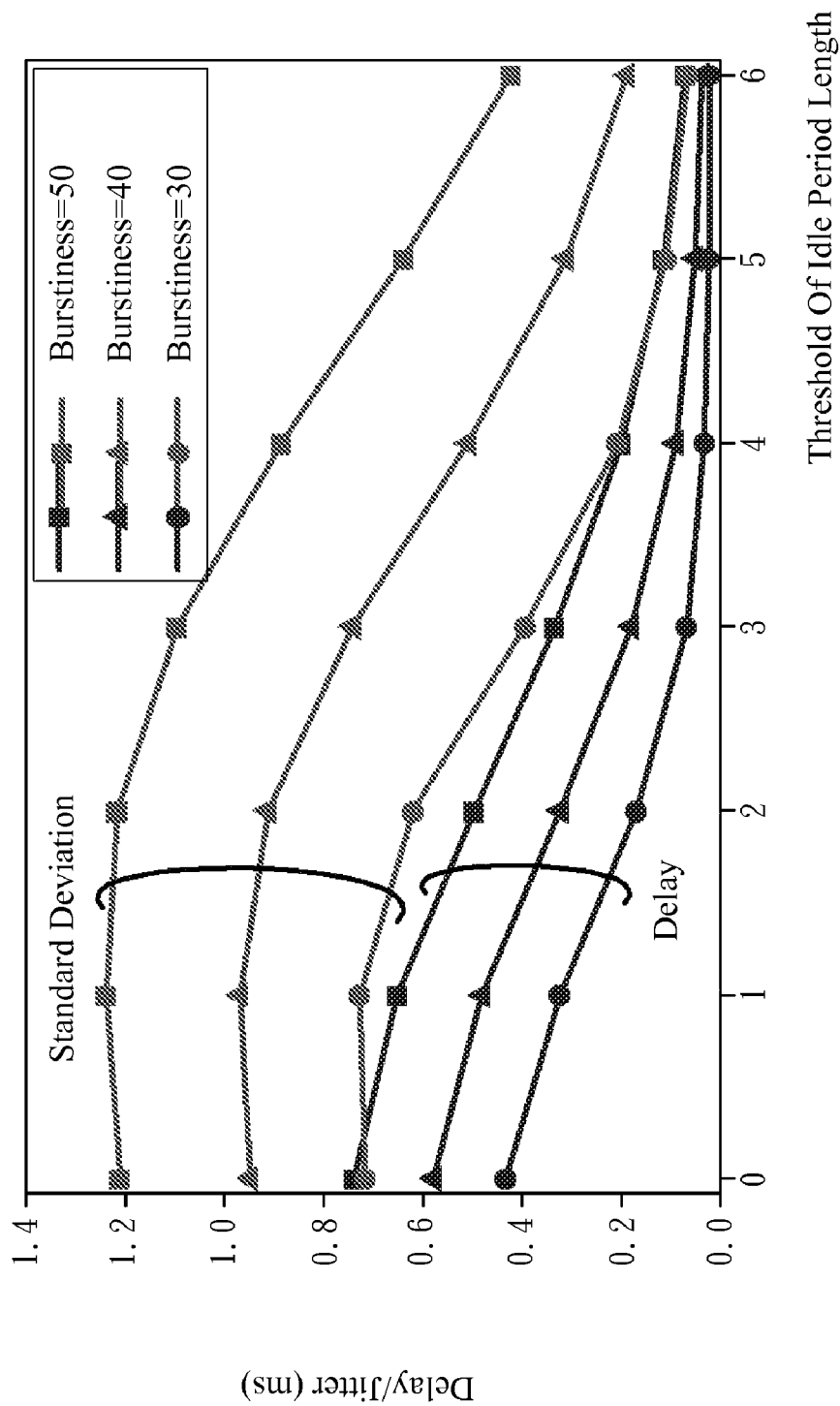
FIG. 13 shows an exemplary schematic view of the pre-defined threshold of the idle time versus the impact of delay/jitter, consistent with certain disclosed embodiments of the present invention.

FIG. 13 shows an exemplary schematic view of the pre-defined threshold of the idle time versus the impact of delay/jitter, consistent with certain disclosed embodiments of the present invention. FIG. 13 assumes two types of traffic. One type is data-ONU and the other is video-ONU, each has about equal amount of traffic. The burstiness are 30, 40, 50, respectively. As shown in FIG. 13, for video-ONU traffic requiring higher assurance on delay/jitter, the increase of threshold $T_i$ may lower the mean and the variance of delay to within the required service quality. As the overall architecture of the exemplary embodiments of the present invention is work conserving, the adjustment of threshold $T_i$ to meet different demands will not increase the loading for the mean delay and the overall performance. Therefore, with appropriate adjustment of threshold $T_i$, the present invention is applicable to different demands of service quality.

In summary, the exemplary disclosed embodiments of the present invention may provide a distributed controlled PON system and a bandwidth control method. The PON system uses a low speed and inexpensive control channel to connect ONUs and provides ONUs to broadcast own bandwidth requirements to other ONUs so that ONUs may obtain the up-to-date state of other ONUs in a timely manner. Based on the received control information, ONUs may execute the distributed DBA method to determine own access time and network access duration. According to the simulation result, the PON system may achieve high bandwidth utilization, low mean delay by using the DBA method of the present invention.

Although the present invention has been described with reference to the exemplary disclosed embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A passive optical network (PON) system, comprising:
   an optical line terminal (OLT)
   a splitter with combiner; and
   a plurality of optical network units (ONUs), each of said ONUs having a first Tx/Rx for transmitting and receiving data packets on an upstream data channel and a downstream data channel through said splitter with combiner to/from said OLT, a second Tx/Rx for transmitting and receiving control messages on an independent control channel to/from said splitter with combiner, and a dynamic bandwidth allocation (DBA) module executing a same DBA algorithm for bandwidth control; wherein said splitter with combiner combines control messages from said ONUs into a combined control message and broadcasts said combined control message to each of said ONUs, and said DBA algorithm is a distributed bandwidth control algorithm executed in each of said ONUs based on said combined control message to decide which of said ONUs has right to use a slot without involving said OLT in the bandwidth control.

2. The PON system as claimed in claim 1, wherein transmission rates for said upstream data channel and said downstream data channel are higher than transmission rate of said independent control channel.

3. The PON system as claimed in claim 1, wherein said DBA module has a table recording state information of said plurality of ONUs.

4. The PON system as claimed in claim 1, wherein said PON system divides each wavelength channel on said PON system into a plurality of fixed-length slots according to time and said DBA module executes said DBA algorithm once before each of said plurality of fixed-length slots starts.

5. The PON system as claimed in claim 1, wherein an ONU system formed by said plurality of ONUs is divided into:
a control part, having a transmitter/receiver module and said DBA module for implementing control on data transmission over said independent control channel and data transmission over said upstream and downstream data channels; and
a data packet transmission/receiving part, based on relation with said OLT, said data packet transmission/receiving part being divided as a downstream part from said OLT to said plurality of ONUs and an upstream part from said plurality of ONUs to said OLT.

6. The PON system as claimed in claim 5, wherein said downstream part organizes received data into a frame through an optical receiving interface, a PON media access control (MAC) mechanism and related buffer and further through a media independent interface, and then transmits said frame through a network physical layer to an end user.

7. The PON system as claimed in claim 6, wherein said upstream part transmits said frame from said end user through a media independent interface to a network media access control (MAC) mechanism and stores in a buffer via a framer to wait for the control from said DBA module for transmission to said OLT.

8. A bandwidth control method, applicable to a passive optical network (PON), said PON at least having an optical line terminal (OLT) and a plurality of optical network units (ONUs), said method comprising:
transmitting an individual control message over an individual control channel from each of said plurality of ONUs during a corresponding mini control slot to a splitter with combiner;
combining the individual control messages into a combined control message in said splitter with combiner and broadcasting said combined control message to each of said plurality of ONUs; and
executing a same dynamic bandwidth allocation (DBA) algorithm for bandwidth control based on said combined control message in each of said plurality of ONUs to determine which ONU has right to use a slot without involving said OLT.

9. The method as claimed in claim 8, wherein said DBA algorithm includes:
from said plurality of ONUs, selecting an ONU with a smallest potential value among said plurality of ONUs having a current queue size greater than 0 and being non-idle as a candidate for using said slot to transmit packets; and
updating a plurality of system related parameters, at least including a current potential value of the selected ONU, a system potential value and an idle period length of the selected ONU.

10. The method as claimed in claim 8, said method is a distributed bandwidth control method.

11. The method as claimed in claim 9, wherein said DBA algorithm uses alternating update of said system potential value and the current potential value of each ONU to avoid long time monopolizing of bandwidth by said plurality of ONUs to achieve bandwidth allocation fairness based on weight ratios.

12. The method as claimed in claim 9, wherein said DBA algorithm maintains long term fairness for said plurality of ONUs with a fluctuating traffic amount through design of the idle period length and a pre-defined threshold for each ONU to achieve bursty traffic adaptation.

13. The method as claimed in claim 8, wherein said PON system divides each wavelength channel on said PON system into a plurality of fixed-length slots according to time and said DBA module executes said DBA algorithm once before each of said plurality of fixed-length slots starts.

14. The method as claimed in claim 12, wherein when an ONU of said plurality of ONUs returns from an idle state to a busy state and has idle time greater than said pre-defined threshold of the ONU, said current potential value of the ONU is updated as a greater one of said system potential value and the current potential value of the ONU.

15. The method as claimed in claim 11, wherein updating an ONU's potential value is triggered by two events, a first event is when the ONU is said selected ONU with the smallest potential value and when the ONU finishes transmitting a packet, and a second event is when the ONU's idle period length exceeds said pre-defined threshold of the ONU and returns from an idle state to a busy state.

16. The method as claimed in claim 15, wherein when in said first event, said ONU's potential value is incremented by (1/pre-defined bandwidth ratio allocated to the ONU).

17. The method as claimed in claim 15, wherein when in said second event, said ONU's potential value is updated as the greater one of said system potential value and the current potential value of the ONU.

* * * * *